A. H. JESSEN.
VARIABLE SPEED POWER TRANSMITTING DEVICE.
APPLICATION FILED JUNE 16, 1913.
1,105,792.
Patented Aug. 4, 1914.
2 SHEETS—SHEET 1.
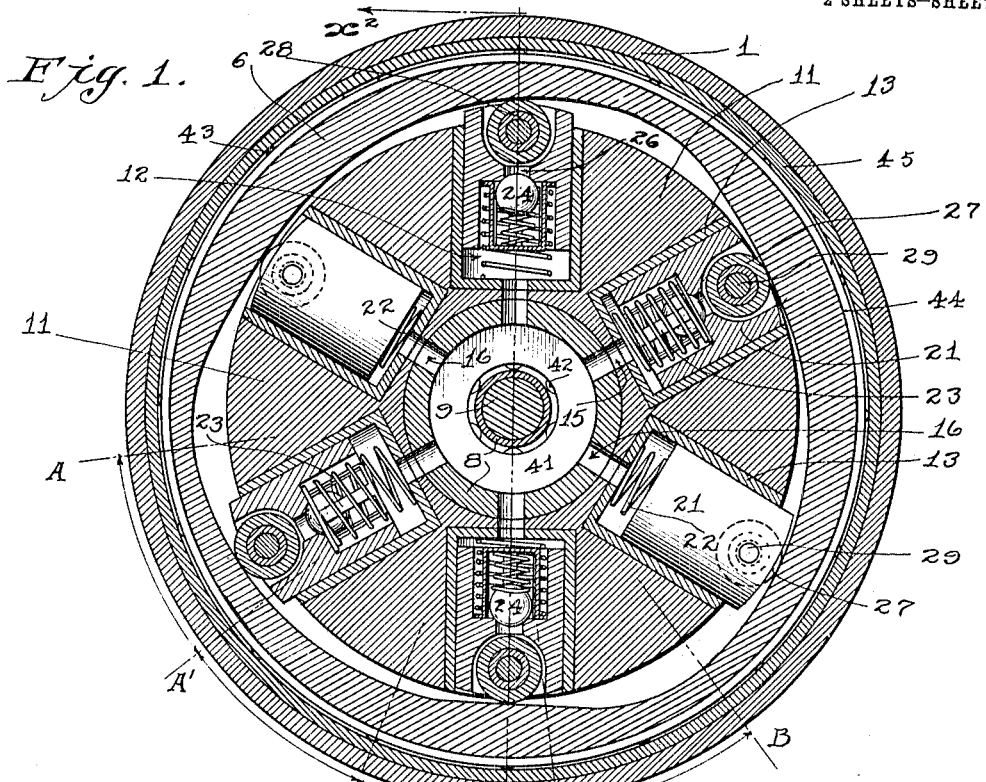
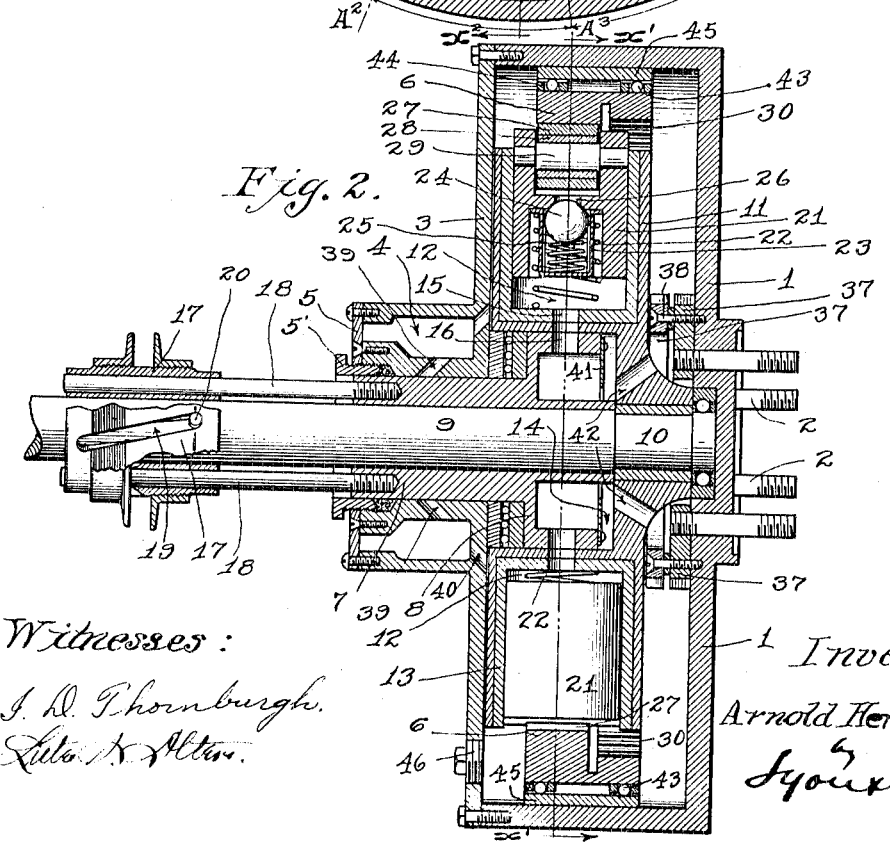
Witnesses:
J. D. Thornburgh.
Lulu K. Alter.
Inventor.
Arnold Henery Jessen.
by Lyon & Hackley
attys.

A. H. JESSEN.
VARIABLE SPEED POWER TRANSMITTING DEVICE.
APPLICATION FILED JUNE 16, 1913.
1,105,792.
Patented Aug. 4, 1914.
2 SHEETS—SHEET 2.
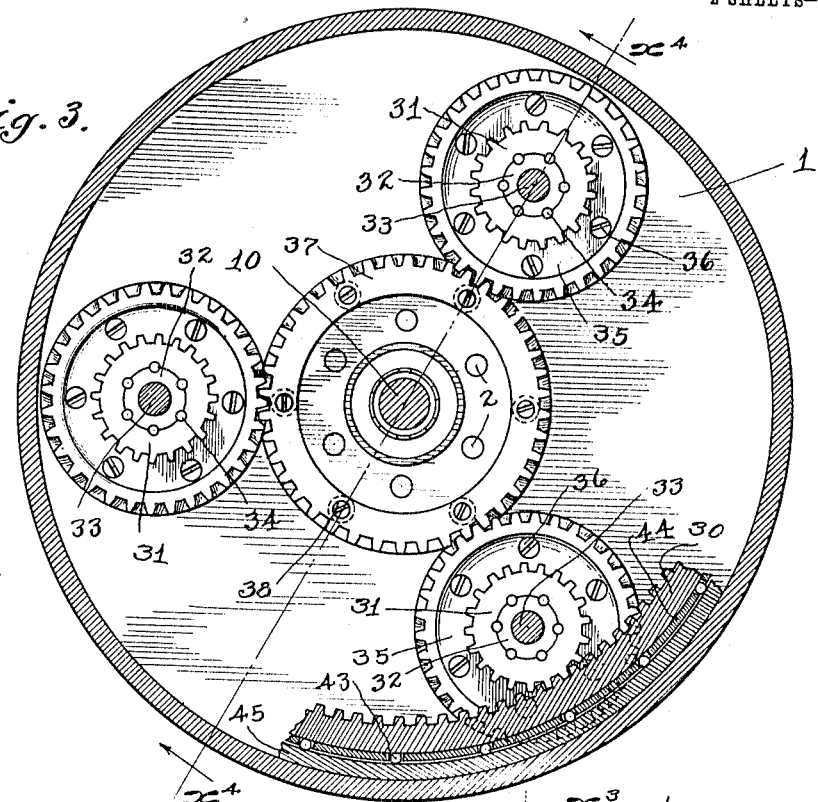
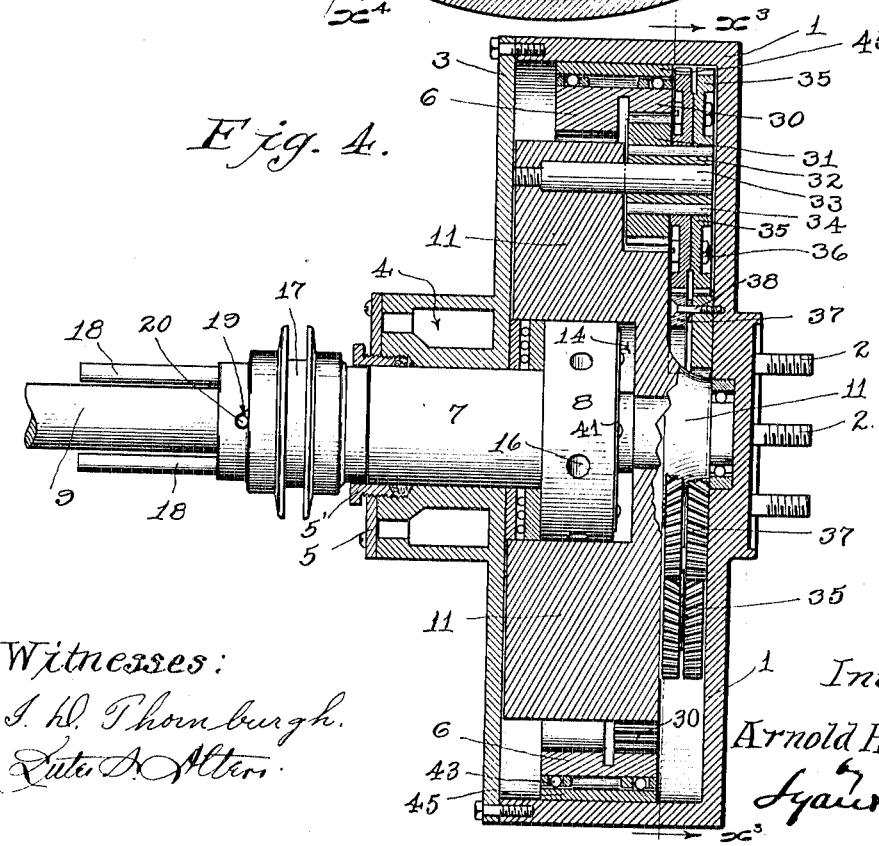
Witnesses:
J. W. Thornburgh.
Luter A. Alters.
Inventor.
Arnold Henery Jessen.
by Syantt Haeuly
attys.

UNITED STATES PATENT OFFICE.

ARNOLD HENERY JESSEN, OF LOS ANGELES, CALIFORNIA.

VARIABLE-SPEED POWER-TRANSMITTING DEVICE.

1,105,792.  Specification of Letters Patent.  Patented Aug. 4, 1914.

Application filed June 16, 1913. Serial No. 773,827.

*To all whom it may concern:*

Be it known that I, ARNOLD HENERY JESSEN, a citizen of the United States, residing at Los Angeles, in the county of Los Angeles and State of California, have invented a new and useful Variable-Speed Power-Transmitting Device, of which the following is a specification.

This invention relates to variable speed power transmitting devices, and particularly to that type in which a fluid is employed between driving and driven members to act as an interposed abutment, and allowed to circulate through a circulatory system with greater or less speed and thus permit a greater or less relative movement or slippage between the driving and driven members, or to cause the two members to be driven in unison. In devices of this character, for example, as shown in a former application of mine filed November 18th, 1912, Serial No. 732,176, is shown a series of pistons carried by one member and caused to reciprocate by contact with a cam carried by the other member. In this construction the cam is carried directly by one of the members and rotates at the same speed therewith, thus giving a relatively high speed of movement to the pistons, with consequent wear and noise, and one of the main objects of the present invention is to provide means for causing this cam or its equivalent to be operated at a less speed than the member with which it is associated and thereby avoid noise and wear, and at the same time producing the necessary piston coöperation. Another advantage is produced from this, in that the piston motion being reduced, results in a reduced speed of flow of the liquid, thus minimizing heat. In addition to these advantages the construction enables the speed of the driven shaft to be reduced below that of the engine or driving shaft, without the use of any further reducing gearing, the device being capable of producing all speeds, from low speed at which the driven shaft travels at a less speed than the engine shaft, up to the highest speed at which it is caused to revolve in unison with the driving shaft. Heretofore in all devices of a similar nature, so far as I am aware, the amount of slippage between the two members has been regulated by varying the size of the port through which the circulating fluid passes. In the present instance while utilizing that feature to an extent, I employ centrifugal force to a large degree for resisting the reciprocation of the pistons and thereby relieve the liquid from a large proportion of work, thus minimizing the friction and heat.

A further object is to provide a multiple sleeved roller which forms the rolling contacting element between the pistons and cam, and the sleeves distribute the friction.

Another object is to provide oil retaining rings to insure a full supply of oil being fed to each cylinder at the suction stroke.

Another important object is to so proportion the cam that there will be a plurality of the pistons traveling through their suction strokes at the same time, and there will be a plurality of pistons traveling through their compression or expulsion strokes, the object being to cause an overlapping of the piston functions, thereby producing a regularity and smoothness of operation as are hereinafter more fully described.

Other objects and advantages will be brought out in the following description.

Referring to the drawings: Figure 1 is a section on line $x^1$—$x^1$, Fig. 2. Fig. 2 is a section on line $x^2$—$x^2$, Fig. 1. Fig. 3 is a section on line $x^3$—$x^3$, Fig. 4. Fig. 4 is a section on line $x^4$—$x^4$, Fig. 3.

1 designates the driving element or shell which is adapted to be secured to the flywheel of the engine shaft not shown, by studs 2. Secured to the shell 1 is a cover 3 with an annular chamber 4 closed by plate 5 and having a stuffing box 5'. The chamber 4 surrounds the hub 7 of a valve 8 and extending through the hub 7 is the driven shaft 9. The shaft 9 is shouldered at 10 and revoluble thereon is the inside rotor 11 which is constructed with a plurality of cylinders 12, each cylinder having a lining 13 which may be renewed when worn. The inside rotor 11 has an inner valve chamber 14 which receives the valve 8 and has ports 15 communicating with the respective cylinders, while the valve 8 has ports 16 adapted to communicate with the respective ports 15.

The valve 8 is controlled by sliding a grooved sleeve 17, the latter sliding on rods 18 which project from the valve hub 7, and the sleeve 17 having one or more angular slots 19 engaging pins 20 on shaft 9, so that when sleeve 17 is shifted, a relative turning movement is produced between shaft 9 and valve 8, thereby regulating the size of opening from the interior of the valve to the respective cylinders or closing the opening entirely.

Slidable in each cylinder is a piston 21 which is yieldingly held outward by a compression spring 22. The inner end of each piston is recessed to receive a flanged valve cage 23 which is nested within the spring 22, the spring bearing against the flanged portion of the cage and holding the cage in position. Inside of each cage is a ball valve 24 which is held yieldingly against its seat by a spring 25 and the piston has a port 26 which is controlled by the valve 24. The outer end of the piston is recessed to receive a roller 27 being mounted on the sleeve 28, which in turn is mounted on a revoluble shaft 29 rotatable in the piston 21. This multiple sleeve arrangement reduces the bearing friction and is an important advantage since there is a considerable thrust of the piston which must be transmitted through the roller whenever the clutch is operating either when there is a relative movement and slippage, or when the parts are locked, giving the highest speed.

Formed on the cam 6 is an internal gear 30 which meshes with three pinions 31 which are keyed to bushings 32 journaled on studs 33 which are screwed into the inside rotor 11. Keys 34 serve for this purpose and also serve to secure to the same bushings 32, larger pinions 35. Each pinion 35, as clearly shown in Fig. 4, consists of two sections secured together by screws 36 and having herring bone teeth, and the three pinions 35 mesh with a center pinion 37 which is likewise formed of two sections with herring bone teeth, and secured by screws 38 to the shell 1.

The chamber 4 communicates through inclined ports 39 with the hub 7 for lubricating the same and these ports enable oil to be thrown away from the hub 7 during the rotation of the clutch and thereby prevent an excess of oil from working longitudinally along the hub 7 and escaping. The packing 5′ retains the small amount required for lubrication. Inclined ports 40 lead from chamber 4 to the space inside the shell 1 exteriorly of the cylinders 12.

An oil retaining plate 41 is secured to the valve 8 and forms an annular cup which when the device is running, is full of oil to the rim on account of the centrifugal action, so that upon the out-stroke of each piston, the suction produced by the piston acts to pull oil from the annular cup in an amount to fill that portion of the cylinder volume which is not filled by oil which is sucked through the check valve. Without this oil retaining ring 41 there would not be enough oil at the ports and much air would be sucked in which would be compressed in the cylinders and cause an uncertain movement of the parts.

Ports 42 lead from the valve chamber 14 in the inside rotor to the space within the shell 1 exteriorly of the cylinders 12. In order to permit the oil to pass from the ports 42 into the space inside the shell 1, one of the center pinions 37 is recessed centrally and the two pinions are spaced apart, as clearly shown in Fig. 2, which allows the oil to pass freely.

The cam 6 is as before described, geared by the reducing gearing with relation to the shell 1, and in order to minimize the friction between the cam and shell 1, I provide ball bearings 43 which are held by retainers 44.

45 is a ring upon which the balls travel and is located on the inner periphery of the shell 1.

46 is a plug for the draining or replenishment of oil.

In operation, oil being within the device, with the shell 1 which is the driving element rotating, if the valve 8 be open, rotation of the shell 1 will impart a slow rotation of the cam 6 by causing pinions 37 to rotate pinions 35 and pinions 35 cause pinions 31 to rotate, and pinions 31 acting upon gear 30 will rotate the cam 6 at a slower speed. The inside rotor 11 which is keyed to the driven shaft 9 is held from movement by the load or by the ordinary natural friction of the stationary machinery now stationary which it is driving, with the result that as the cam rotates it acts against rollers 27 and causes the pistons to reciprocate and produce a circulation of oil through the ports. As there is no restriction to this circulation of oil, there is no force exerted upon the inside rotor sufficient to cause it to revolve, as the pistons are unresisted in their movements and readily moved by the cam. By adjusting the valve 8 to restrict the flow of oil, then the oil in the cylinders acts to resist the inward movement of the pistons and to that extent, opposes inward movement of the pistons, which opposing force is exerted against the cam with the result that the inside rotor is caused to commence to turn at a speed proportioned to the resistance thus presented by the oil to retard the inward movement of the pistons. This resistance is increased by further adjusting the valve 8 to decrease the port area, and by entirely closing the ports the oil within the cylinders will act as an immovable abutment to positively prevent the pistons from moving inward, with the result that the cam then carries the protruding pistons around with it at the same speed, thereby causing the driven shaft 9 to rotate at the same speed as the cam. It will be noted that when the cam is thus locked against relative rotation with respect to the inside rotor, that then, the shafts 33 of the pinions 31 and 35 are prevented from bodily rotation, with the result that the pinions 37 acting against pinions 35, causing the entire gearing to revolve as an integral unit with no internally relative moving parts, as at such time it is impossible for the pinions 31 to rotate axially upon their shafts 33, because pinions 35 are locked against movement with respect to internal gear 30, and the only way pinions 31 can rotate axially is for their shafts 33 to have bodily movement with respect to gear 30. From this it will be seen that the parts are so combined that I am enabled to produce an infinite number of speeds from zero to maximum, and that at all speeds less than maximum, the gearing affords a regular gear reduction without corresponding loss of power such as is the case in all devices of a similar nature in which lower speeds are obtained purely by allowing a greater slippage of the liquid. As the inside rotor commences to rotate, the pistons 21 are held outwardly by centrifugal force corresponding in amount to the speed of rotation and to the weight of the pistons. This centrifugal force is a very material factor in holding the pistons against inward movement when the speed increases and this is desirable, because it relieves the oil from pressure, and resultant friction and heat are eliminated. This elimination of heat and friction is highly important because it has, in devices of this nature, heretofore been seriously detrimental.

The cam 6 is divided into three main divisions. In Fig. 1, A—B designates one such division, and each division is subdivided into four subdivisions, as A—$A^1$; $A^1$—$A^2$; $A^2$—$A^3$; $A^3$—B. The cam is proportioned to give $\frac{1}{32}$nd of an inch movement to a piston for every 5° of rotation from A to $A^1$; and to give $\frac{1}{16}$th of an inch movement to a piston for every 5° of rotation from $A^1$ to $A^2$; and to give $\frac{1}{32}$nd of an inch movement to a piston for every 5° of rotation from $A^2$ to $A^3$; and to give $\frac{1}{4}$th of an inch of movement to a piston in moving from $A^3$ to B during each 5° which will allow a quick outward or suction movement from $A^3$ to B. There are thus six divisions giving simultaneous compression motion to all six pistons when the pistons are respectively traveling as follows: three pistons traveling in the three zones A—$A^1$, and each having $\frac{1}{32}$nd of an inch movement ratio, and three pistons traveling in the three zones $A^2$—$A^3$, each having $\frac{1}{32}$nd of an inch movement ratio. At other times only three pistons are traveling in three zones $A^1$ to $A^2$, and at such times only three pistons traveling in three suction zones $A^3$—B; but at this time the rate of travel of the three pistons in zones $A^1$ to $A^2$ is at $\frac{1}{16}$th of an inch movement ratio which is twice that when all six were compressing, as before stated, so that this and at all times, the rate of compression is maintained at the full amount. This evenly distributes the pressure to the driven element and causes a regular flow of oil and consequent regularity of operation of the driven element.

In addition to the aforementioned advantages derived by the gearing down of the cam with respect to the driving element, it will also be seen that on account of the slow moving cam produced by this gear reduction the hammering effect of the cam against the rollers of the piston is minimized to the fullest extent and noise and wear correspondingly eliminated.

What I claim is:

1. A driving member, a driven member, a plurality of cylinders carried by one of said members, pistons in said cylinders, a cam against which said pistons bear, and a reducing gearing between said cam and driving member.

2. A driving member, a driven member, a plurality of cylinders carried by one of said members, pistons in said cylinders, a cam against which said pistons bear, a reducing gearing between said cam and driving member, fluid confining means communicating with said cylinders, fluid in said confining means, and means for regulating the cross sectional area of a portion of said confining means to restrict the flow of fluid therethrough.

3. A driving member, a driven member, a cam, reducing gearing between said cam and driving member, means on the driven member and movable thereon and bearing against said cam, and means for restricting the movement of said movable means.

4. A driving member, a pinion thereon, an inside rotor, pinions journaled on the inside rotor and meshing with the first pinion, a cam revoluble on the driving member, an internal gear on said cam meshing with the second named pinion, cylinders formed in the inside rotor, and pistons in the cylinders bearing against said cam.

5. A driving member, a pinion thereon, an inside rotor, pinions journaled on the inside rotor and meshing with the first pinion, a cam revoluble on the driving member, an internal gear on said cam meshing with the second named pinion, cylinders formed in the inside rotor, pistons in the cylinders bearing against said cam, the inside rotor having a central valve chamber with ports extending from the cylinders into the valve chamber, a valve in said valve chamber, and means for adjusting said valve with relation to the inside rotor.

6. A driving member, a cam mounted thereon, an inside rotor, cylinders in the inside rotor, pistons in the cylinders, the inside rotor having a valve chamber with ports extending from the valve chamber to the respective cylinders, a valve in said valve chamber, and a ring on said valve forming an annular oil recess in the valve for retaining oil.

7. An inside rotor, cylinders formed therein, linings in the cylinders, pistons in the cylinders, the inside rotor having ports, means for regulating the size of the ports, a check valve in each piston comprising a flanged valve cage, a spring nesting with the valve cage and bearing against the flange thereof, the other end of the spring bearing against the inner end of the cylinder, a valve in said cage, a spring in said cage between the valve and the end of the cage, the pistons having a port communicating with the valve therein, a driving member, a cam carried thereby, and rollers on the pistons bearing against said cam.

8. An inside rotor, cylinders formed therein, linings in the cylinders, pistons in the cylinders, the inside rotor having ports, means for regulating the size of the ports, a check valve in each piston comprising a flanged valve cage, a spring nesting with the valve cage and bearing against the flange thereof, the other end of the spring bearing against the inner end of the cylinders, a valve in said cage, a spring in said cage between the valve and the end of the cage, the pistons having a port communicating with the valve therein, a driving member, a cam carried thereby, rollers on the pistons bearing against said cam, each of said rollers comprising a series of sleeves revoluble with respect to each other, and a shaft on which the innermost sleeve revolves, said shaft being journaled in the associated piston.

9. A driving member comprising a shell, a ring inside said shell, ball bearings on said ring, a cam supported by the ball bearings, an internal gear at one side of the cam, an inside rotor revoluble with respect to the shell, a series of pinions journaled on the inside rotor and engaging said internal gear, a pinion mounted on the shell and meshing with the first pinions, cylinders formed in the inside rotor, pistons in the cylinders, rollers on the pistons bearing against the cam, the inside rotor having a central valve chamber with ports communicating with the cylinders, said inside rotor having ports extending from said valve chamber directly to the space within the shell, and means for adjusting said valve with respect to the inside rotor.

In testimony whereof, I have hereunto set my hand at Los Angeles, California this 9th day of June, 1913.

ARNOLD HENERY JESSEN.

In presence of—
GEO. T. HACKLEY,
F. A. CRANDALL.